United States Patent [19]

Balaban

[11] Patent Number: 4,481,564
[45] Date of Patent: Nov. 6, 1984

[54] SWITCHED-MODE POWER SUPPLY

[75] Inventor: Suchen Balaban, Lake Bluff, Ill.

[73] Assignee: Zenith Electronics Corporation, Glenview, Ill.

[21] Appl. No.: 416,201

[22] Filed: Sep. 9, 1982

[51] Int. Cl.³ .................................... H02M 3/335
[52] U.S. Cl. .................................... 363/21; 363/80
[58] Field of Search .................. 363/18, 19, 20, 21, 363/97, 131, 79, 80

[56] References Cited

U.S. PATENT DOCUMENTS

| | | | |
|---|---|---|---|
| 3,873,846 | 3/1975 | Morio et al. | 307/23 |
| 3,889,173 | 6/1975 | Klusmann et al. | 363/19 |
| 4,063,307 | 12/1977 | Stephens | 363/21 |
| 4,092,709 | 5/1978 | Voigt et al. | 363/18 |
| 4,130,862 | 12/1978 | Holt | 363/21 |
| 4,208,705 | 6/1980 | Hosoya | 363/19 |
| 4,228,493 | 10/1980 | de Sartre et al. | 363/56 |
| 4,253,137 | 2/1981 | Rao | 363/21 |
| 4,276,586 | 6/1981 | Boekhorst | 363/21 |
| 4,327,404 | 4/1982 | Horiguchi | 363/19 |

OTHER PUBLICATIONS

Boschert, Flyback Converters, Electronics, Dec. 21, 1978; pp. 100–104.

Primary Examiner—William M. Shoop
Assistant Examiner—Jeffrey Starrett

[57] ABSTRACT

A switched-mode power supply providing high speed switch operation and high efficiency is disclosed. Faster switch turn-off is accomplished by means of an additional primary winding in the power supply's converter transformer which causes switching current to be diverted from the switch element when the oscillating switch transitions to the cut-off state. More rapid switch turn-on is achieved by shunting current from the regulation circuit of the power supply during initial switch turn-on in providing the entire switch control output of a blocking oscillator to the switch element. Power supply regulation is provided by an optical link including a photodiode coupled to a secondary of the converter transformer and a phototransistor which controls the input provided to the switch by the blocking oscillator. More rapid switch operation improves the inductive transfer of energy in the switched-mode power supply thus increasing power supply efficiency and prolongs the operating lifetime of the power supply's switch element.

9 Claims, 1 Drawing Figure

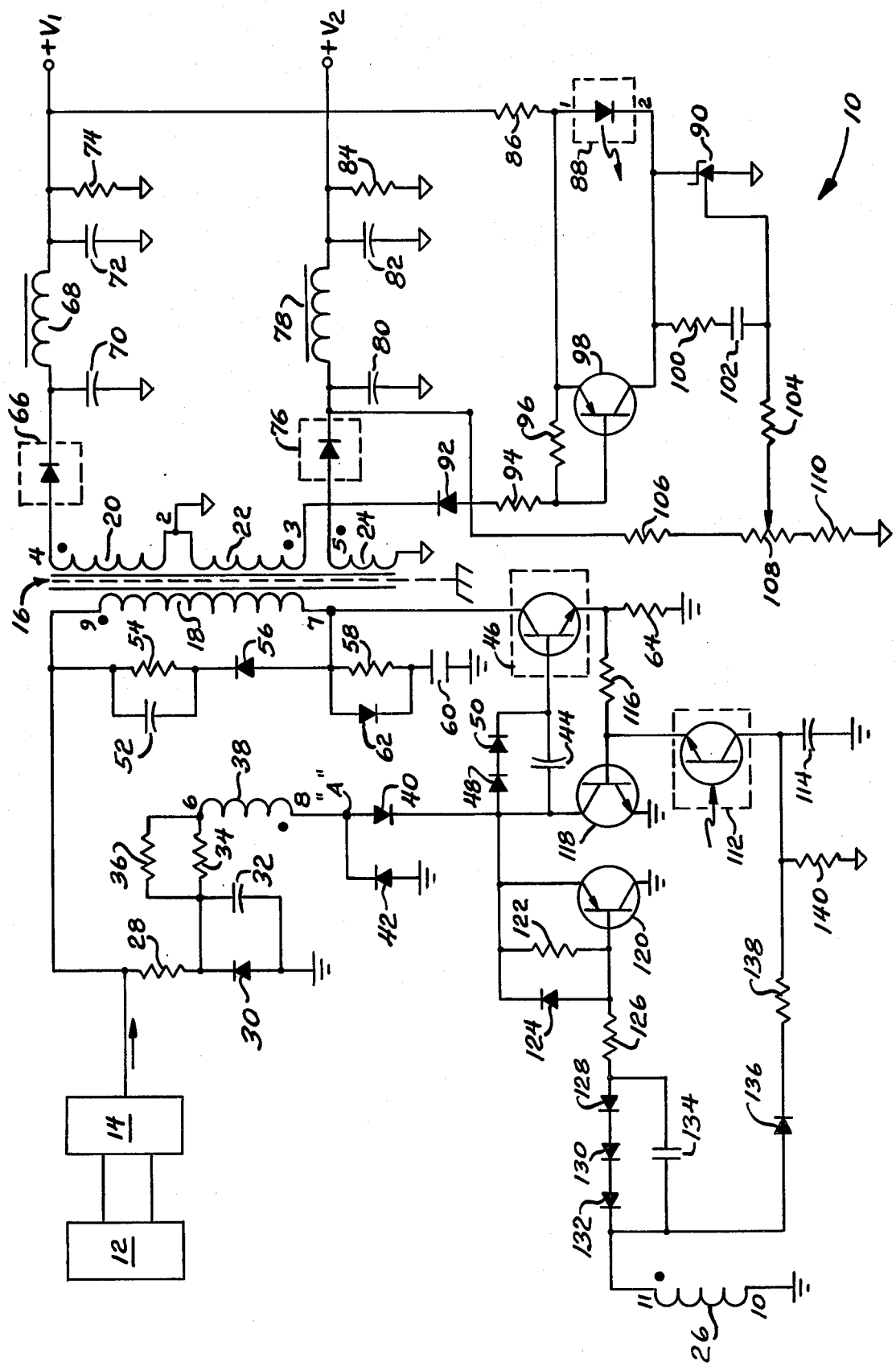

SWITCHED-MODE POWER SUPPLY

BACKGROUND OF THE INVENTION

This invention relates generally to a power supply circuit which produces a DC output voltage by periodically actuating a switching element and is specifically directed to improving the efficiency of such a switched-mode power supply by increasing the turn-on/turn-off speed of the switching element.

In general, a switched-mode power supply converts a DC input voltage into a DC output voltage which is substantially independent of variations in the input voltage and variations in a load driven by the output voltage. This type of power supply typically includes a series arrangement of an inductance and a controllable switch element connected to a drive or control circuit and responsive to switching pulses generated by the control circuit. The switching pulses alternately drive the switch element into the conducting and the cut-off states for the sequential storage and discharge of energy in the inductance. The aforementioned inductance is typically the primary winding of a transformer which is inductively coupled to a secondary winding thereof. A rectifier couples the output of the secondary winding to a filter capacitor for providing a level DC output voltage to a load.

During the time interval when the switch is cut-off, a substantially large amplitude sinusoidal oscillation is established across the inductance. The frequency of this oscillation is determined by the value of the leakage inductance and of the distributed capacitance in parallel with the inductance. During a portion of the operating cycle of the power supply the switch is rendered conductive causing a current provided by an input voltage source to pass through the inductor so that energy is stored therein. During the other part of the operating cycle, in which the switch nonconductive, the energy stored in the inductor produces a current through the rectifier which charges the capacitor and, consequently, replenishes the energy losses caused by the load. By controlling the conductive period of the switch relative to the total operating cycle, the DC output voltage can be maintained at a constant value despite fluctuations in the input voltage, which typically is derived from an AC line source.

U.S. Pat. No. 3,873,846 to Morio et al discloses a DC power supply circuit of the switching or chopping type which is provided with a switching circuit for an AC power supply and a switching circuit for a DC power supply. The switching circuits are connected to respective primary windings of a transformer having a secondary winding for supplying an operating voltage to a load circuit. Each of the switching circuits includes a switching transistor controlled in its on-duration in accordance with the magnitude or amplitude of the voltage applied to the load circuit so as to maintain the output drive voltage at a predetermined level. U.S. Pat. No. 4,327,404 to Horiguchi discloses a power supply circuit which intermittently produces a DC power source voltage by periodically actuating a switching transistor and smoothing the thus-produced voltage, thereby obtaining a DC voltage of a predetermined level. The output voltage level is compared with a pedetermined reference voltage level so that the ON period of the switching transistor is shortened when the output voltage level is higher than the predetermined reference level, and the ON period of the switching transistor is lengthened when the output voltage level is lower than the predetermined reference level. This approach allegedly provides a stabilized and ripple-free output voltage by controlling the duty cycle of the switching element in a feedback signal arrangement. U.S. Pat. No. 4,276,586 to Boekhorst similarly is directed to a tuned switched-mode power supply for producing a stabilized DC output voltage by controlling the duration of the conducting period of a bidirectional switch as a function of the output voltage. Pulse duration modulation is used to control the drive switching pulses which energize the switching element of this switched-mode power supply. U.S. Pat. No. 4,253,137 to Rao relates to a switched-mode power supply wherein the duration of the conducting state of the switch is adjustable depending upon the output voltage which is the sum of a first DC voltage generated by a first rectifier and a second DC voltage generated by a second rectifier with the first and second DC voltages respectively generated during the conduction and cut-off states of the switching element.

The most common type of switching element used in a switched-mode power supply is a transistor which is driven in an oscillating state by the output of a blocking oscillator. As shown by the aforementioned patents, the duration of the switch-off drive pulses of the switching transistor is generally not constant but varies with the output voltage. If the switch is rendered conductive before inductance oscillation has been completed, or at an instant in which the voltage across the transistor is not zero, large energy dissipation and possible damage may occur in the switching transistor. Protection circuits have been devised in order to avoid the untimely conduction of the switching transistor which typically provide that the ratio between the duration of the switch-off drive pulses of the switching transistor and the period of time between two consecutive cut-off pulses cannot assume certain values.

Another approach to controlling the conduction periods of the switching element in a switched-mode power supply is disclosed in U.S. Pat. No. 4,228,493 to Sartre et al wherein switching element frequency control is accomplished via a delay network by means of a control signal obtained from pulse duration modulation control circuitry, with the duration of the switch-off pulses having a substantially predetermined duration which is longer than half a cycle of the resonant frequency of the resonant circuit comprised of an inductance and a tuning capacitor in the switched-mode power supply. Although providing control over the switching frequency of the switch element with respect to the oscillation of the resonant circuit, this approach requires a relatively complicated pulse duration modulation control circuit in integrated form for generation of the control signals.

These and other problems encountered in the prior art are avoided by the present invention which allows for a rapid switching rate in the switching element of a switched-mode DC power supply in providing for more efficient inductive energy coupling and prolonging the operating lifetime of the semiconductor switching element.

OBJECTS OF THE INVENTION

Accordingly, it is an object of the present invention to provide an improved switched-mode power supply.

It is another object of the present invention to improve the energy efficiency of a switched-mode power supply by increasing the turn-on and turn-off speeds of the switching element therein.

Another object of the present invention is to increase the operating lifetime of a periodically actuated switching element in a switched-mode DC power supply.

A further object of the present invention is to provide a switched-mode power supply having a voltage regulation circuit coupled to the power supply's switching element for not only controlling the on and off states thereof, but also for controlling the rate at which said switching element transitions between said on and off states.

BRIEF DESCRIPTION OF THE DRAWING

The appended claims set forth those novel features believed characteristics of the invention. However, the invention itself, as well as further objects and advantages thereof, will best be understood by reference to the following detailed description of a preferred embodiment taken in conjunction with the accompanying drawing which shows in schematic diagram form a switched-mode power supply in accordance with a preferred embodiment of the present invention.

DESCRIPTION OF THE PREFERRED EMBODIMENT

Referring to the FIGURE, there is shown a switched-mode power supply 10 in accordance with a preferrred embodiment of the present invention.

The switched-mode power supply 10 is energized by a DC voltage source 14 which typically is a rectifier/regulator circuit which is coupled to an AC voltage source 12. The AC voltage source 12 is generally a line-derived AC voltage which is converted to a DC voltage by means of the rectifier/regulator circuit 14.

The DC voltage output from the rectifier/regulator circuit 14 is provided to the primary winding 18 of a converter transformer 16. The converter transformer 16 includes a plurality of primary windings 18, 26 and 38 and secondary windings 20, 22, and 24. Secondary windings 20, 22, and 24 inductively coupled to the primary winding 18 with all transformer windings wound on a common core of converter transformer 16. The winding sense of the various windings are indicated by means of polarity dots. In addition, the various pin connections to the respective ends of the several windings of the converter transformer 16 are provided with appropriate numerical designations in the FIGURE. A plurality of DC output voltages $V_1$, $V_2$ are provided on the respective secondary windings of transformer 16 which provides isolation between the DC input voltage provided to primary winding 18 and the various DC output voltages. In addition, the DC input side of converter transformer 16 is referenced to neutral ground potential, while the output portion of converter transformer 16 is "hot", or referenced to a floating ground voltage and thus provided with "hot" ground symbols in the FIGURE.

In addition to being provided to the primary winding 18 of the converter transformer 16, the input voltage is also provided via an RC network comprised of resistor 28 and capacitor 32 to a blocking oscillator circuit comprised of capacitor 32, resistors 34, 36, and inductor 38, which is a primary winding, or coil, of converter transformer 16. Resistor 28 and capacitor 32 provide a time delay prior to the start of power supply operation during which capacitor 32 is charged up to approximately 2.5 VDC. Current is then provided through the parallel arrangement of resistors 34, 36 to winding 38. The RCL resonant circuit oscillates at a frequency determined by the values of the various components providing a pulsed output to the base of switching transistor 46 via diode 40 and AC coupling capacitor 44.

When the input voltage is initially applied to the power supply 10, it operates in a blocking oscillator mode of operation wherein capacitor 32 discharges causing pin 6 of winding 38 to assume a very negative voltage value. The resistive time constant provided by resistors 34, 36 tends to pull down the voltage of capacitor 32 which could result in the possibly dangerous destruction of capacitor 32. Grounded diode 30 is coupled across capacitor 32 in order to prevent capacitor 32 from going more negative than −0.7 volts. Grounded diode 42 provides for current flow only into the base of switching transistor 46 by preventing the potential at point "A" from going more than −0.7 volts negative. Diodes 48, 50 provide a voltage drop across capacitor 44 for proper turn-off biasing of switching transistor 46.

When switching transistor 46 is rendered conductive by an input voltage applied to its base, a DC voltage is applied across primary winding 18 of the converter transformer 16 with current flowing from pin 9 to pin 7 thereof and thence via switching transistor 46 and resistor 64 to ground. With switching transistor 46 operated in a pulsed mode, when it turns off current flows through diode 62 and charges grounded capacitor 60. This quickly removes the current in switching transistor 46 and bypasses it to ground via diode 62 and charging capacitor 60. The voltage rise across switching transistor 46 is slowed by charging capacitor 60. When the switching transistor 46 is rendered conductive in the next operating cycle, capacitor 60 discharges via resistor 58 in providing current to the collector of switching transistor 46. A combination of capacitor 52, resistor 54 and diode 56 performs another function in that it clamps the rate of voltage increase across the primary winding 18 following the turn-off switching capacitor 46. When switching transistor 46 turns-off, a large impedance is introduced into the circuit with the inductance of primary winding 18 tending to substantially increase the voltage thereacross. The combination of capacitor 52, resistor 54 and diode 56 limits the rate of voltage increase across the primary winding 18 when switching transistor 46 again conducts with capacitor 52 discharging by means of resistor 54 and capacitor 60 discharging by means of resistor 58. Diode 56 performs a blocking function in preventing capacitor 52 from discharging across switching transistor 46 following its turn-on.

The converter transformer 16 includes three secondary windings 20, 22 and 24. A first DC voltage output $V_1$ is derived from secondary winding 20 in response to an input provided to the primary winding 18 of the converter transformer. The output of secondary winding 20 is rectified by means of the combination of diode 66 and grounded capacitor 70 and is filtered and regulated by means of the combination of inductor 68, capacitor 72 and resistor 74. Similarly, the output of secondary winding 24 is rectified by means of diode 76 and capacitor 80 and filtered and regulated by means of inductor 78, capacitor 82 and resistor 84 to provide a smooth DC output voltage $V_2$ in a conventional manner. While only two output voltages are shown in the FIGURE, the present invention envisions providing any number of DC output voltages of virtually any desired value and of either polarity by merely incorporating the required number of turns and winding sense in a particular winding of the converter transformer. Such techniques are well known in the art and do not form a part of the present invention.

While secondary windings 20, 24 are wound in the same sense as primary winding 18 thus providing a positive output in response to a positive input provided to primary winding 18, a third secondary winding 22 is wound in a reversed sense and provides an output from pin 3 thereof for controlling the voltage regulator portion of the present invention. A voltage regulator circuit includes an optical coupler comprised of photodiode 88 and phototransistor 112. The anode (pin 1) of photodiode 88 is coupled to the $V_1$ output of secondary winding 20 while the cathode (pin 2) of the photodiode is maintained at a reference voltage by means of grounded shunt regulator 90. When $V_2$ increases so as to increase the current in shunt regulator 90, an optical signal is provided to phototransistor 112 rendering it conductive. A variable voltage dividing network comprised of fixed resistors 106 and 110 and variable resistor 108 provides a variable feedback control for selectively adjusting the current at which photodiode 88 initially conducts, or the threshold voltage of the optical coupler. As the current into photodiode 88 increases, the optical output therefrom also increases resulting in a proportionally harder turn-on of phototransistor 112. A voltage is maintained across phototransistor 112 by means of grounded capacitor 14 such that when phototransistor 112 is rendered conductive upon receipt of an optical input from photodiode 88, NPN transistor 118 is turned on in response to an output from the emitter of phototransistor 112. With transistor 118 rendered conductive, a portion of the output of the blocking oscillating circuit, which includes winding 38, is diverted to ground reducing the drive signal provided to the base of switching transistor 46. This reduces the current flowing in primary winding 18 and the energy transferred therefrom to the various secondary windings. The output voltage of the switched-mode power supply 10 is thus regulated to a predetermined value by means of a reference voltage provided by shunt regulator 90.

Coupled across photodiode 88 is an PNP shunt transistor 98. The base of shunt transistor 98 is coupled to pin 3 of secondary winding 22 via current limiting resistor 94 and diode 92. Winding 22 is wound in a reverse sense with respect to primary winding 18 and the other secondary windings 20, 24. Thus, a positive pulse in primary winding 18 will induce a negative pulse in secondary winding 22 resulting in the turn-on of the PNP shunt transistor 98. Resistor 96 is coupled across the base-emitter junction of transistor 98 for proper turn-on biasing thereof. When switching transistor 46 conducts, the voltage on pin 3 of secondary winding 22 is more positive than that on pin 2 thereof. This maintains shunt transistor 98 nonconductive. The power supply is then in the regulation mode of operation with current in the shunt regulator 90 and photodiode 88 being controlled by the feedback signal level from the $V_1$ output of the power supply divided down by resistors 106, 108 and 110. As the voltage at pin 5 of secondary winding 24 increases, more current flows to the $V_1$ output. When pin 3 of secondary winding 22 is more positive than pin 2, switching transistor 46 is in a conductive state with diode 92 back biased and current shunted across the base-emitter junction of transistor 98 via resistor 96 in maintaining transistor 98 in the cut-off state. When switching transistor 46 turns off, pin 3 of secondary winding 22 goes more negative than pin 2, forcing current through resistor 94 and the base-emitter junction of transistor 98 turning it on. This results in current from the $V_1$ output of the power supply being shunted around photodiode 88 into the emitter of shunt transistor 98 and out its collector to ground via shunt regulator 90. Resistors 100 and 104 and capacitor 102 form a feedback compensating network for insuring more stable operation of the regulator portion of the present invention. By thus shunting current from photodiode 88 when NPN switching transistor 46 is in the cut-off state, the regulator circuit of the power supply is rendered inoperative and thus does not divert current from the base of switching transistor 46. This insures that the full output of the blocking oscillator provided to the base of switching transistor 46 in effecting the rapid turn-on thereof. It is in this manner that the switching transistor is turned on more rapidly so as to minimize the power applied thereto and the heat dissipated therein. This not only prolongs switching transistor operating lifetime, but also increases the efficiency of inductive energy transfer in the converter transformer 16.

When switching transistor 46 is conductive, current flows via resistor 64 to ground. When the voltage thus developed across grounded resistor 64 causes a large enough current to be provided to the base of transistor 118 via resistor 116 for the turn-on thereof, current is shunted by means of transistor 118 from the base of switching transistor 46 to neutral ground potential. Thus, the combination of resistors 64, 116 and transistor 118 performs a current limiting function with respect to switching transistor 46.

Regulation of the output of the switching transistor 46 is accomplished in the following manner. A DC voltage is applied across grounded capacitor 114 by means of current flowing through the second primary winding 26. When phototransistor 112 is rendered conductive upon receipt of an optical input from photodiode 88, current flowing through phototransistor 112 is provided to the base of transistor 118 effecting the turn-on thereof. When transistor 118 is rendered conductive, current from the output of the blocking oscillator which includes winding 38 is diverted from the base of switching transistor 46 and directed to neutral ground potential via NPN transistor 118. Reducing the current provided to the base of switching transistor 46 reduces the level of energy coupled from primary winding 18 to the various secondary windings of converter transformer 16. It is in this manner that the several DC output voltages of the switched-mode power supply 10 are regulated.

When switching transistor 46 conducts, pin 11 of primary winding 26 is more positive than pin 10 thereof causing current to flow through diode 136 in the voltage dividing network comprised of resistors 138, 140 to grounded capacitor 114 for the charging thereof. Thus, a potential is maintained across phototransistor 112.

The output of winding 38 is provided not only to the base of switching transistor 46 but also to primary winding 26 via PNP transistor 120, resistor 126 and a serial arrangement of diodes 128, 130 and 132. When switching transistor 46 is rendered nonconductive, the base drive current provided thereto is diverted to neutral ground potential via transistor 120 thus insuring rapid turn-off of the switching transistor 46. During the other half of the oscillating operating cycle of primary winding 26 capacitor 134 discharges via resistor 126 to the base of transistor 120 turning it off. Thus, when a subsequent turn-on input is provided to the base of switching transistor 46, with transistor 120 in a nonconductive state the entire output of the blocking oscillator is provided to the base of switching transistor 46. This insures more rapid turn-on of the switching transistor. A diode 124 prevents the base of switching transistor 46 from going to a high positive voltage and permits discharging current from capacitor 134 to be provided to the base of switching transistor 46 for increasing the turn-on speed thereof. When switching transistor 46 begins to turn off, pin 11 of primary winding 26 goes negative resulting in the turning on of transistor 120 and the more rapid turning off of switching transistor 46. With pin 11 of primary winding 26 thus negative, diodes 128, 130 and 132 maintain transistor 120 conductive in order to avoid false triggering of the switching transistor 46 until all energy is removed from the converter transformer 16. This prevents an unwanted noise input from turning on switching transistor 46. The discharge of capacitor 134 provides an AC path for rapidly turning on switching transistor 46.

There has thus been described a switch-mode power supply in which more efficient inductive transfer of energy is made possible and switching element operating lifetime is prolonged by increasing transition speeds of the switching element of the power supply.

While particular embodiments of the present invention have been shown and described, it will be obvious to those skilled in the art that changes and modifications may be made without departing from the invention and its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a switched-mode power supply for converting an input voltage into a DC output voltage, said power supply including switching means responsive to an input current for operating in a self-oscillating mode for producing a DC power supply voltage, actuation means coupled to said switching means and responsive to said input voltage for providing an input current to said switching means for initiating the operation thereof in said self-oscillating mode, a transformer having a plurality of primary windings including a first primary winding in circuit with said switching means and a plurality of secondary windings inductively coupled to said primary winding and in each of which an output voltage is generated in response to said intermittently produced DC power supply voltage, a control circuit for controlling the operation of said switching means comprising:

regulating means coupled to said switching means and to a first secondary winding of said transformer and responsive to an output voltage for periodically rendering said switching means alternately in the conducting and cut-off states wherein said switching means is rendered in said cut-off state by the diversion of said input current therefrom by said regulating means with the duration of the conducting state of said switching means determined by the value of said output voltage, said regulating means including a photocoupler responsive to said output voltage for diverting said input current from said switching means when said output voltage exceeds a reference voltage level;

first circuit means coupled to said regulating means and to a second secondary winding of said transformer and responsive to the current induced therein by the DC power supply voltage provided by said switching means for rendering said regulating means inoperative when said switching means is in the cut-off state such that upon turn-on of said switching means no input current is initially diverted therefrom; and second circuit means coupled to said actuation means and to a second primary winding of said transformer and responsive to the absence of current therein following the cut-off of said switching means for diverting the input current of said actuation means from said switching means when said switching means is rendered in said cut-off state.

2. A control circuit in accordance with claim 1 wherein said switching means includes a transistor with said input current provided to the base thereof for providing said DC power supply voltage to the first primary winding of said transformer.

3. A control circuit in accordance with claim 2 wherein said photocoupler includes a photodiode responsive to said output voltage and a phototransistor optically coupled to said photodiode and coupled to said actuation means for diverting said input current from said switching means.

4. A control circuit in accordance with claim 3 wherein said reference voltage level is established across said photodiode means of a shunt regulator.

5. A control circuit in accordance with claim 1 wherein said first primary and secondary windings possess opposite polarity with said first circuit means rendered conductive when said switching means is in the cut-off state thereby diverting said output voltage from said regulating means in rendering said regulating means inoperative.

6. A control circuit in accordance with claim 1 wherein said actuation means includes a blocking oscillator, said blocking oscillator including a third primary winding of said transformer.

7. A control circuit in accordance with claim 1 wherein said first and second primary windings possess the same polarity and wherein said second circuit means includes a first transistor switch coupled to said second primary winding, said first transistor switch rendered conductive by the input current from said actuation means for diverting the input current from said switching means following the rendering of said switching means in the cut-off state.

8. A control circuit in accordance with claim 7 wherein said second circuit means further includes means for turning off said first transistor switch after it is rendered conductive in diverting the input current from said switching means.

9. A control circuit in accordance with claim 8 wherein said turn-off means includes the combination of a second transistor switch and a capacitor coupled to said second primary winding wherein the discharge of said capacitor renders said second transistor switch nonconductive for terminating the diversion of the input current from said switching means.

* * * * *